June 21, 1960 K. C. MARD 2,941,549
ACCUMULATOR
Filed Dec. 31, 1956

INVENTOR
KENNETH C. MARD
BY *Jack N. M. Carthy*
AGENT

United States Patent Office 2,941,549
Patented June 21, 1960

2,941,549

ACCUMULATOR

Kenneth C. Mard, Stratford, Conn., assignor to United Aircraft Corporation, East Hartford, Conn., a corporation of Delaware Filed Dec. 31, 1956, Ser. No. 631,562

8 Claims. (Cl. 138—30)

This invention relates to an accumulator and to a braking system and is shown in connection with an aircraft rotor brake system.

An object of this invention is to provide a brake system which will stop the rotor head of a helicopter from turning, when necessary, in which the deceleration is limited.

Another object of this invention is to provide a rotor brake system having an accumulator which can be left in a locked position.

A further object of this invention is to provide a rotor brake system in which an accumulator provides for thermal expansion and contraction between changing temperatures preventing the releasing of the brake at low temperatures.

Another object of this invention is to provide an accumulator which is not dependent on air pressure.

A further object of this invention is to provide an accumulator having no moving seals.

Another object of this invention is to provide an accumulator which is preloaded mechanically.

A further object of this invention is to provide an accumulator which is preloaded in a manner deforming the rubber to the same slope as it would have if it were subjected to a predetermined pressure.

Another object of this invention is to provide an accumulator which will accept a prescribed amount of fluid while maintaining the pressure on the fluid at a value within a predetermined minimum and maximum.

Other objects and advantages will be apparent from the specification and from the accompanying drawings which illustrate the invention.

Figure 1:
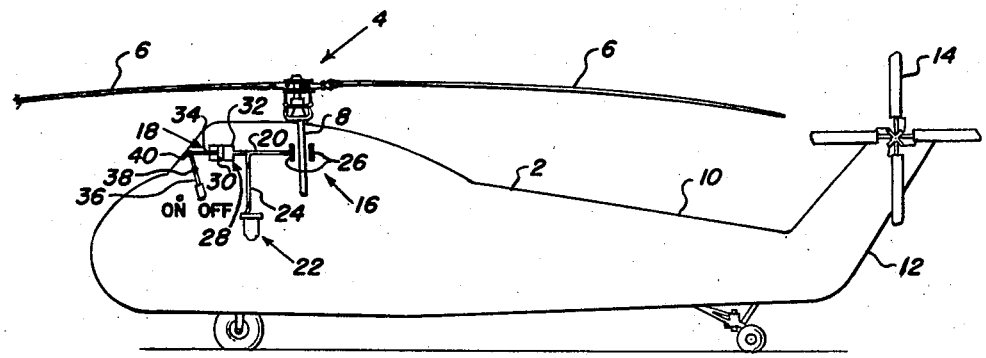
Fig. 1 is a side elevational view of a helicopter showing the invention in a schematic form as applied to the drive shaft of the rotor.

While Fig. 1 shows the silhouette of a specific helicopter, it is to be understood that the rotor shaft brake system can be used on any type of helicopter or on any rotating shaft. Further, referring to Fig. 1, a helicopter is shown having a body 2 which generally houses the pilot or cargo compartments and engine compartment. It is shown having a main rotor 4 with blades 6 attached thereto being mounted for rotation on a drive shaft 8. A pylon 12 extends upwardly from tail cone 10. A tail rotor 14 is mounted on said pylon. This helicopter may be controlled by any control mechanism desired, such a control mechanism being shown in the patent to Alex, United States Patent No. 2,720,271.

The rotor brake system consists of three main parts: (1) the rotor brake 16 which engages the shaft 8, (2) the actuating mechanism 18 which is connected to the brake 16 by fluid line 20 and provides the force for operating said brake, and (3) an accumulator 22 which is connected to the fluid line 20 by a fluid line 24.

The rotor brake 16 can be of any fluid operated type in which a band, pads or shoes 26 are positioned around a rotor shaft, or member connected thereto, for frictional engagement therewith to prevent or oppose rotation. A brake of this type is shown in the application to Tolomeo et al., Application Serial No. 491,886, now Patent No. 2,880,810, filed March 3, 1955, for a Blade Positioner.

The actuating mechanism 18 comprises a cylinder and piston unit 28 having a piston 30 slidably mounted within a cylinder 32. One end of said cylinder 32 is connected to the rotor brake 16 by a fluid line or conduit 20 to actuate the means 26. The piston 30 has a piston rod 34 fixed thereto which extends through the other end of said cylinder. An actuating lever 36, which is pivoted at 38, has a connection with the piston rod 34 at 40 which permits movement of the piston 30 upon movement of the lever 36. The actuating lever 36 can be moved between an "on" and "off" position. This lever may be locked in either position by any means desired. While a hand actuated mechanism has been shown, any suitable type of actuating mechanism can be used.

Figures 2, 3:
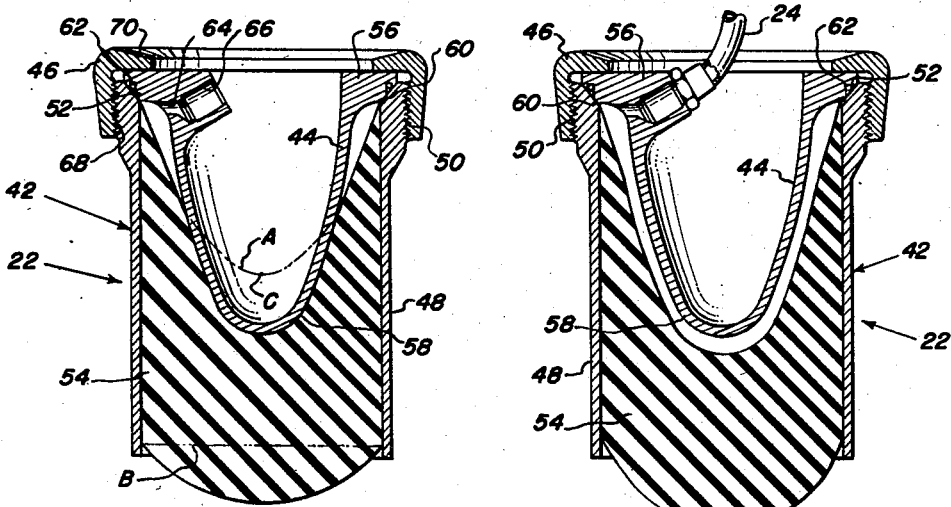
Fig. 2 is a sectional view of the accumulator used in the rotor brake system when it is subjected to a pressure under the designated preload pressure.
Fig. 3 is a sectional view of the accumulator used in the rotor brake system when it is subjected to a pressure greater than the designated preload pressure.
Figure 4:
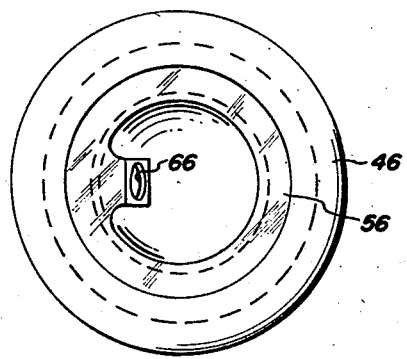
Fig. 4 is a top view of Fig. 2.

An accumulator 22 is connected in the rotor brake system shown to the fluid line 20 by a fluid line or conduit 24. The accumulator 22 is made up of three main parts: (1) a cushion assembly 42, (2) an end cap 44, and (3) an end nut 46. The cushion assembly comprises a cylindrical metal shell 48 having one end externally threaded with threads 50. The end of the shell having the external threads 50 is formed with an inwardly tapering face 52. A cylindrical rubber filler 54 is positioned in the cylindrical shell 48 with its outer cylindrical surface being fixedly adhered to the inner cylindrical surface of the shell 48. The filler may be adhered by any satisfactory means such as vulcanizing or bonding. The rubber filler 54 is shaped originally to conform to the dot and dash lines A and B as shown in Fig. 2. The surface of the concave face of the filler 54 represented by the dot and dash line A is so formed to utilize the rubber more efficiently. The surface of the concave face extends from the outer circumferential edge of the filler where it is attached to the shell 48 to an apex at C. In the filler assembly shown, the distance from the top edge of the rubber filler to the apex C is approximately one-half the length of the rubber filler 54 from its one outer circumferential end to the other. The curve shown in Fig. 2 by the dot and dash line A is shown as a parabola formed from the equation $$y = a + KR^2$$

where $y$ = filler thickness
$a$ = thickness through filler at point C
$K$ = a constant which determines the slope of the parabola
$R$ = radius of filler However, other curves will do including a cone. This type of a surface provides for a more even stress distribution through the rubber filler when it is under the operating pressures to which it is subjected.

The end cap 44 is formed having an annular member 56 with a hollow projection 58 extending therefrom. The end cap member 56 is adapted to be positioned so that the projecting portion 58 extends into the concave portion of the filler 54. A tapered surface 60 is formed on the annular portion of the end cap to have a sealing engagement with the tapered face 52 of the shell 48. A groove is formed in the surface 60 to receive an O-ring 62. A passageway 64 extends from one side of said hollow projection 58 to the other. The end of said passageway 64 on the inner side of said projection has a fitting 66 to receive one end of the fluid line 24.

An annular end nut 46 is formed having internal threads 68 which are adapted to threadably engage threads 50 of the metal shell 48. An inwardly projecting flange 70 on said nut 46 engages the outer edge of the annular member 56 of the end cap 44 on the opposite side of the projecting portion 58. This annular end nut 46 holds the accumulator 22 in its assembled position.

The hollow projection 58 extending from annular member 56 of the end cap 44 has its outer surface formed so that, when it is forced into position as shown in Fig. 2, it mechanically forms the rubber filler to the same slope as it would have if it were preloaded by some predetermined fluid pressure. This predetermined pressure provides the minimum pressure of the fluid in the system at which the accumulator 22 will have an effect and the projection reduces the amount of fluid necessary for operation of the accumulator and rotor brake system. This specific predetermined pressure ($P_{pre}$) is a figure obtained from the requirements of a specific braking system and is placed at a value below the minimum pressure needed for proper brake operation. It can be seen that for a given volume of fluid displaceable by piston 30, a higher pressure is obtained with the projection 58 rather than a flat plate. This permits the fluid to act more quickly on the brake in a proper manner.

For example, in a system such as shown in Fig. 1, the desired operating range of brake pressures ($P_{min}$ to $P_{max}$) would be known along with the normal operating brake pressure ($P_{norm}$). Further, for a given system, the amount of fluid ($V_b$) necessary to operate the brake at this normal operating pressure, the amount of fluid in the connecting lines ($V_l$), and the amount of fluid ($V_p$) displaceable by the piston 30 from the cylinder 32 would also be known. Assuming that the rotor brake system is going to be subjected to temperatures ranging between $-65°$ F. and $160°$ F., the expansion of the fluid ($V_{ex}$) in the system can be readily figured between these temperatures. While the temperature range $-65°$ F. to $160°$ F. has been used, it is to be understood that any operating range can be used and the expansion of fluid and relative volumes calculated accordingly. From the data set forth above, using safety factors, the amounts of fluid the accumulator will have to accept for proper operation can be figured.

The filler is then formed of such a shape and has a durometer reading so that in operation it will accept a prescribed amount of fluid due to change in volume of fluid and maintain a pressure in the system within the range $P_{min}$ to $P_{max}$. It can be seen that it is necessary for the volume of the fluid displaceable by piston 30 to be greater than the volume of fluid accepted by the brake for proper operation plus a small volume of fluid reacting with the filler at $-65°$ F.

In operation, when it is necessary to brake the drive shaft 8 of a helicopter, the actuating lever 36 is moved to its "on" position. If it is desired for the brake to remain on, it is locked in this position. As the actuating lever 36 is moved to its "on" position, it moves a piston 30 which displaces fluid from a cylinder 32 which is moved through fluid lines 20 and 24 to the brake 16 and accumulator 22 respectively. The fluid is forced into the brake 16 until the fluid pressure in the system has reached a predetermined pressure at which the accumulator has been preloaded. At this point fluid flows into the accumulator raising the pressure in the entire system until the lever 36 has reached its full "on" position. When locked in this position, fluid volume changes in the system will not affect the brake operation since, as stated hereinbefore, the accumulator maintains the brake operating pressure between a desired operating range.

It is to be understood that the invention is not limited to the specific embodiment herein illustrated and described, but may be used in other ways without departure from its spirit as defined in the following claims.

I claim:

1. An accumulator comprising a hollow member, a resilient solid filler fixed in said member, and end cap fixed to one end of said member, a projection extending away from said end cap towards said filler and preloading it, and a passageway extending through said end cap.

2. An accumulator comprising a cylinder, a resilient solid filler fixed in said cylinder, said filler having a concave end, an end cap fixed to one end of said cylinder forming a chamber with said concave end of said filler, a projection extending away from said end cap into said concave end of said filler and preloading it, and a passageway extending through said end cap to said chamber.

3. An accumulator comprising a cylinder, a resilient filler fixed in said cylinder, said filler having a concave end, an end cap fixed to one end of said cylinder forming a chamber with said concave end of said filler, a projection extending away from said end cap into said concave end of said filler and preloading it, and a passageway extending through said end cap to said chamber, said projection deforming said filler so that it assumes the shape it would at some fluid pressure.

4. An accumulator comprising a hollow member having an inner surface, a resilient filler having an outer surface, said outer surface of said resilient filler being fixed to the inner surface of said hollow member, an end cap fixed to one end of said member, a projection extending from said end cap towards said filler and preloading it, and a passageway extending through said end cap.

5. An accumulator comprising a cylinder having an inner surface, a resilient filler having an outer cylindrical surface, said outer cylindrical surface of said filler being substantially equal to the inner surface of said cylinder, said outer surface of said filler being fixed to the inner surface of said cylinder, said filler having a concave end, an end cap fixed to one end of said cylinder forming a chamber with said concave end of said filler, a projection extending from said end cap into said concave end of said filler preloading it, and a passageway extending through said end cap to said chamber.

6. An accumulator comprising a hollow member, a resilient filler fixed in said member, said filler occupying a substantial portion of the space within said hollow member, an end cap fixed to one end of said member, a projection extending away from said end cap towards said filler and preloading it, and a passageway extending through said end cap.

7. An accumulator comprising a cylinder, a resilient filler fixed in said cylinder, said filler occupying a substantial portion of the space within said cylinder, an end cap fixed to one end of said cylinder, a projection extending away from said end cap towards one end of said filler and preloading it, said other end of said filler being free to move, and a passageway extending through said end cap.

8. An accumulator comprising a cylinder having an inner surface, a resilient filler having an outer surface, said outer surface of said resilient filler being fixed to the inner surface of said cylinder, an end cap fixed to one end of said cylinder, a projection extending from said end cap towards one end of said filler and preloading it, said other end of said filler being open to atmosphere, and a passageway extending through said end cap.

References Cited in the file of this patent

UNITED STATES PATENTS

| | | |
|---|---|---|
| 1,786,856 | Madden | Dec. 30, 1930 |
| 2,401,792 | Overbeke | June 11, 1946 |
| 2,495,693 | Byrd et al. | Jan. 31, 1950 |
| 2,630,834 | Weber et al. | Mar. 10, 1953 |
| 2,721,580 | Greer | Oct. 25, 1955 |
| 2,755,820 | Taylor | July 24, 1956 |
| 2,760,518 | Peet | Aug. 28, 1956 |
| 2,844,227 | Armstrong | July 22, 1958 |
| 2,883,180 | Moulton | Apr. 21, 1959 |